Jan. 2, 1968 J. L. EAVES 3,361,971

AUTOMATIC GAIN CONTROL FOR MULTIPLE RECEIVER CHANNELS

Filed Oct. 20, 1964 3 Sheets-Sheet 1

INVENTOR.
JERRY L. EAVES

BY Harry A. Herbert Jr
and George Fine
ATTORNEYS

Jan. 2, 1968 J. L. EAVES 3,361,971

AUTOMATIC GAIN CONTROL FOR MULTIPLE RECEIVER CHANNELS

Filed Oct. 20, 1964 3 Sheets-Sheet 2

INVENTOR.
JERRY L. EAVES
BY Harry A. Herbert, Jr
and George Fine
ATTORNEYS

INVENTOR.
JERRY L. EAVES
BY Harry A. Herbert Jr
and George Fine
ATTORNEYS

United States Patent Office 3,361,971

Patented Jan. 2, 1968

3,361,971
AUTOMATIC GAIN CONTROL FOR MULTIPLE RECEIVER CHANNELS

Jerry L. Eaves, Mableton, Ga., assignor, by mesne assignments, to the United States of America as represented by the Secretary of the Air Force Filed Oct. 20, 1964, Ser. No. 405,309
5 Claims. (Cl. 325—303)

This invention relates to an automatic gain control system for multiple receiver channels and more particularly to a system for automatically balancing the gain between receiver channels of a radar.

In certain types of search radar, there is a requirement for multiple individual receiver channels. If in addition to range information there is also added the requirement for height information then there is imposed the additional requirement that there be gain balance between adjacent receiver channels at the output of, for example, Log Receivers (i.e. for equal input signals to two adjacent channels, the two output signals from the Log Receiver be equal).

To insure gain balance between channels in the prior radar art, two motor driven gain balance controls were provided for each channel. The first group of controls were at the inputs to a Gated Receiver and were used to compensate for RF gain variations. The second group of controls were at the input to the Log Receiver and were used to compensate for IF Gain variations.

The receiver RF gain balance was set up by: (1) applying equal RF input pulses to two adjacent channels, (2) manually closing a switch that energizes the RF gain control motor for one of the two channels, (3) holding the switch closed until equal outputs are observed on a monitor oscilloscope. The receiver IF gain balance procedure was the same as that used for the RF gain balance except the pulses were injected at IF instead of RF and the IF gain control motor was energized instead of the RF.

The receiver RF gain became unbalanced when the transmitter frequency was changed; therefore, each time the transmitter frequency was shifted to a different part of the band, the receiver RF gain required rebalancing.

It has been possible to balance the IF gains in the Log Receiver of all systems that have reached test thus far; however, there have been cases where gain variations have necessitated repeating the gain balance procedure several times in an 8 hour period.

Since certain types of radar must continuously provide target information to an automatic data processing system (i.e., SAGE), it is desirable that during radar operations, all electrical alignment discrepancies, where possible, should be corrected automatically. Therefore a continuous automatic gain balance for multiple receiver channels is provided by the present invention.

In accordance with the present invention there is provided continuous automatic gain balance between individual receiver channels of a radar system by selecting one of the channels in the radar system as a reference channel. This reference channel is then adjusted to have the desired gain and all other receiver channels are continuously and automatically balanced against the reference channel by means of individual electronic circuits which automatically actuate a gain balance control motor in the Log Receiver of each channel to continuously maintain the proper gain balance between receiver channels.

In a preferred embodiment of the present invention the control circuits are arranged such that on each side of the reference channel automatic gain adjustment of the receiver channel nearer the reference channel always takes precedence over all other receiver channels, and each succeeding channel is compared with the balanced adjacent channel output until the desired gain balance in all receiver channels is produced.

An object of the present invention is to provide a system for continuously and automatically balancing the gain between the individual receiver channels of a radar system.

Another object of the present invention is to provide an automatic and continuous gain control system for multiple receiver channels.

Yet another object of the present invention is to provide continuous automatic gain balance between individual receiver channels of a radar system by selecting one of the channels as a reference and balancing all other channels against the reference.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
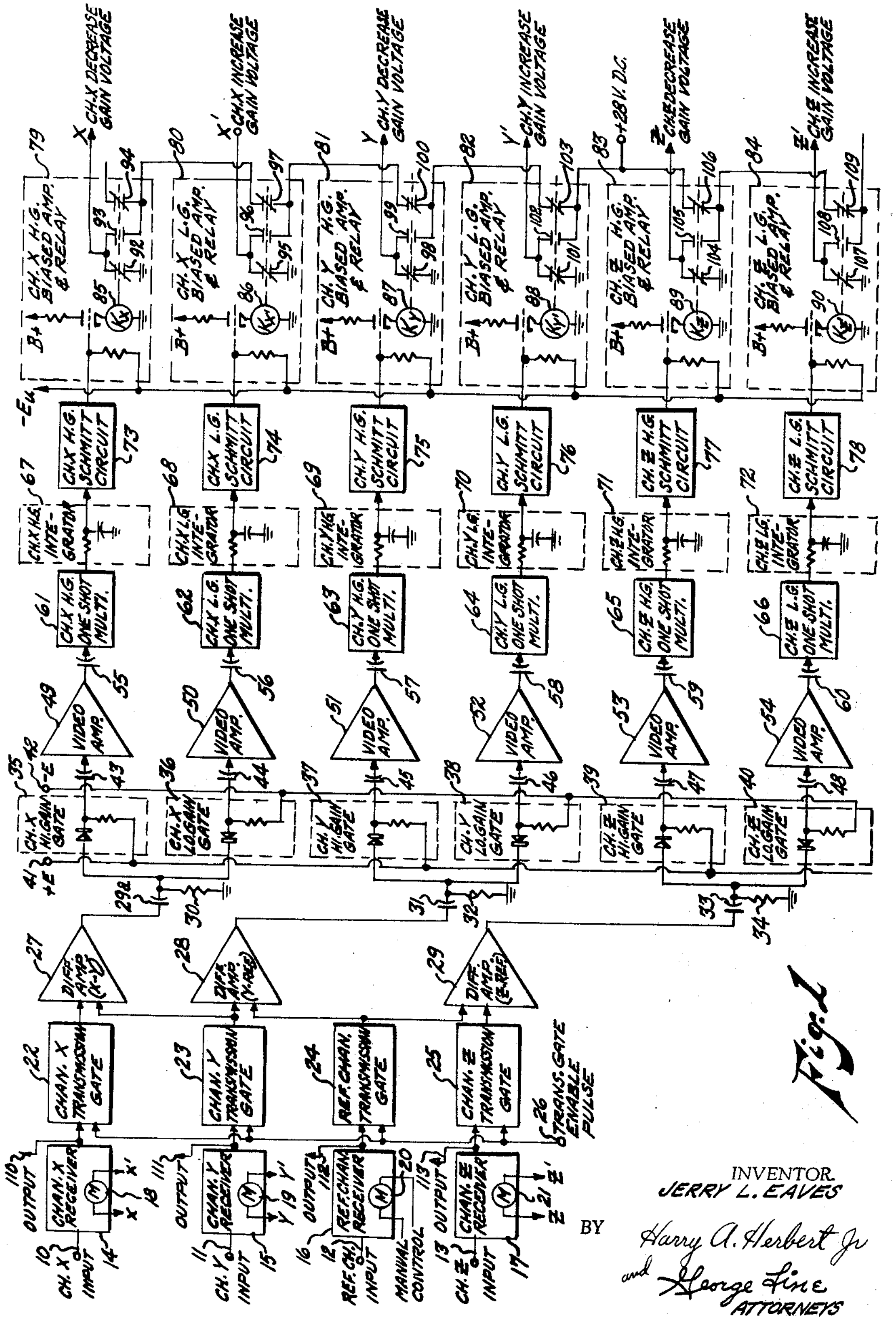
FIGURE 1 is a preferred embodiment of the present invention partly in block and partly in schematic form showing a four channel system.

Now referring in detail to FIGURE 1, there are shown Log Receivers 14, 15, 17 and 16 associated with channels X, Y, Z, and reference, respectively. The receivers are associated with a multi channel and or system. Each of the receivers are gain controlled in the conventional manner by means of a variable potentiometer integrated therewith. The gain of reference channel receiver 16 is adjusted to some predetermined level by its integrated potentiometer and then the gains of receivers 14, 15, and 17 are set to the same level as receiver 16. Gain control balance motors 18, 19, and 21 are provided for receivers 14, 15, and 17, respectively, and are connected so as to rotate its associated gain adjusting potentiometer in accordance with a correction signal hereinafter described. Motor 20 is provided for reference receiver 16 and is interconnected with a gain adjusting potentiometer for said receiver. However, motor 20 is manually operated.

Receivers 14, 15, 16 and 17 are provided with input terminals 10, 11, 12 and 13, respectively. With equal coincident test input pulses to receivers 14, 15, 16 and 17, equal output pulses appear thereat for application to transmission gates 22, 23, 24 and 25, respectively. Simultaneously, when automatic gain balance is desired the transmission gates have applied thereto enabling pulses thereby permitting the output pulses from the receivers to pass on to differential amplifiers 27, 28 and 29. Differential amplifier 27 receives the output from gate 22 and gate 23 and provides an output which is equal to the output of gate 22 minus that of gate 23. Differential amplifier 28 receives the output from gates 23 and 24 and the output therefrom is equal to the output of gates 24 minus that of gate 23. Differential amplifier 29 receives the output from gates 24 and 25 and provides an output equal to the output of gate 22 minus that of gate 25.

With aforesaid equal coincident pulses to input terminals 10, 11, 12 and 13, the output from differential amplifiers 27, 28 and 29 would be zero. If for some reason the gain of channel X receiver 14 decreases, then for equal coincident inputs to each channel, difference amplifiers 28 and 29 outputs will be zero but the output from difference amplifier 27 will be a negative pulse as illustrated by the waveform shown in FIGURE 3B.

The negative pulse is applied simultaneously to high gain gate 35 and low gain gate 36 by way of RC network 29 and 30. High gain gate 35 and low gain gate 36 have a positive and negative voltage of a predetermined magnitude applied thereto by way of terminals 41 and 42, respectively. When the amplitude of negative pulse applied to low gain gate 36 is greater than its negative bias voltage then a negative output pulse is provided thereby which is applied to one shot multivibrator 62 by way of capacitor 44, video amplifier 50, and capacitor 56. One shot multivibrator 62 is triggered thereby and provides a positive output pulse having a width of 2500 microseconds as illustrated in the waveform shown in FIGURE 3C. The 2500 microsecond pulse appears at the input of integrator circuit 68, a simple RC network, which has a response to a series of 2500 microsecond pulses as shown in the waveform of FIGURE 3D.

A threshold switch circuit is provided for each integrator and it consists of a Schmitt binary circuit followed by an amplifier that is normally biased off. The amplifier has a relay in its cathode. For example, the output of integrator 68 is connected to Schmitt circuit 74 and amplifier 80. Amplifier 80 has relay 86 in its cathode circuit. Relay 86 has three contacts 95, 96 and 97. Contacts 95 and 97 are normally closed and contact 96 is normally opened.

Figure 3:
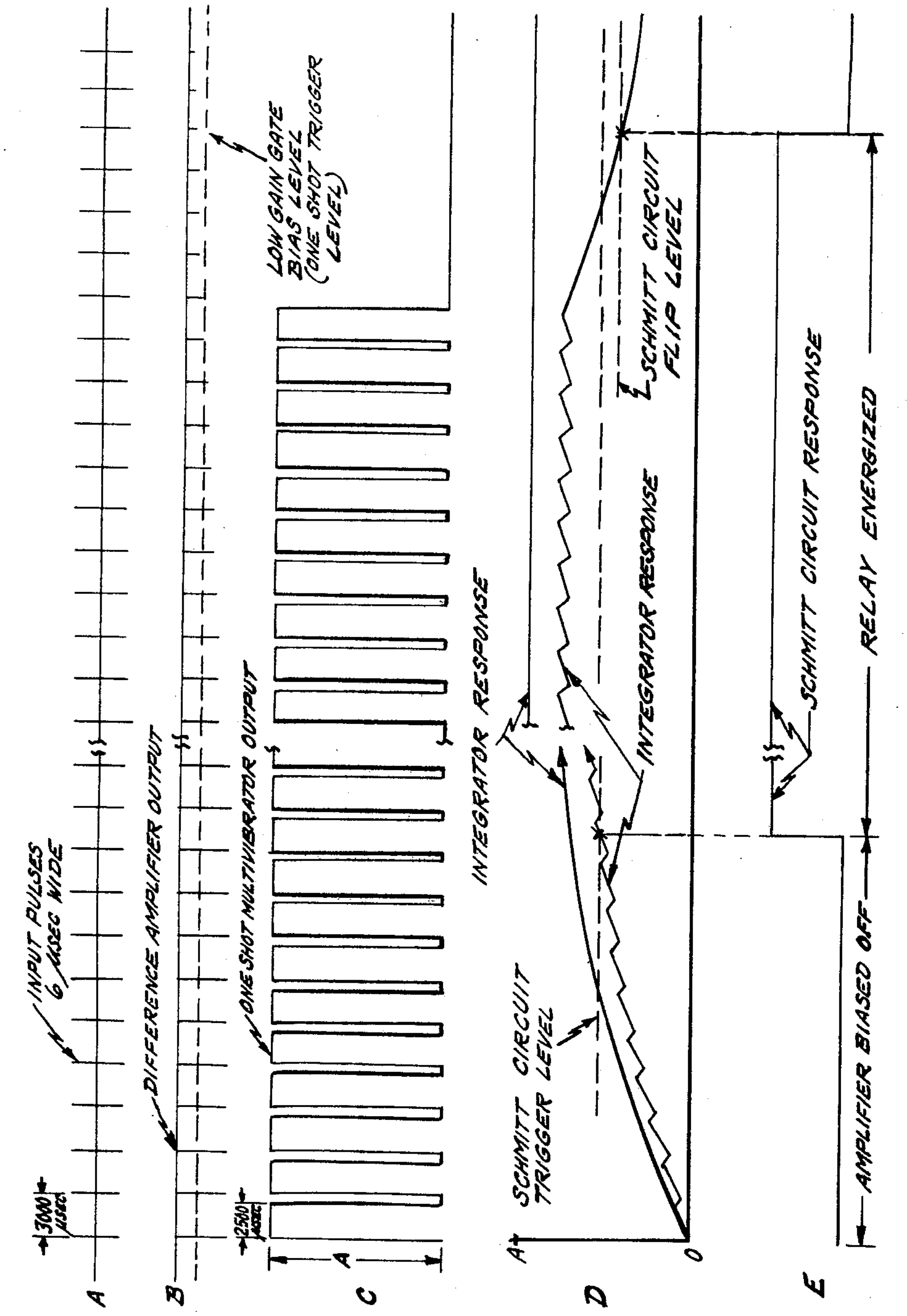
FIGURE 3 shows the various waveforms associated with FIGURE 1.

Assume that equal gain balance test pulses as shown in FIGURE 3A are put into each channel every 3000 microseconds. After a predetermined number of pulses, the output of integrator 68 will trigger Schmitt circuit 74. The output of Schmitt circuit 74 will be sufficient to cause biased off amplifier 80 to go into conduction and thereby energize cathode circuit relay 86. Energizing the relay opens contacts 95 and 97 and closes contact 96 and thus completes a circuit that supplies 28 volts DC from terminal 91 to gain balance motor 18 by way of terminal $X^1$. Gain balance motor 18 rotates in the direction that causes channel X receiver 14 to increase in gain. The gain will continue to increase until cathode circuit relay 86 is de-energized.

As channel X receiver, gain is increased, the negative unbalance pulse from difference amplifier 27 decreases in amplitude. Eventually the unbalance pulse decreases to a value that does not exceed the bias voltage of low gain gate 36 and hence one shot multivibrator 62 is no longer triggered. Since the 2500 microsecond pulse is no longer present the output of integrator 68 decreases to the value at which Schmitt circuit 74 flips and causes amplifier 80 to be biased off. Cathode circuit relay 86 is de-energized and thereby breaks the +28 volts DC circuit to channel X gain balance motor 18. The waveforms shown at FIGURE 3E in conjunction with 3D illustrates this as indicated by the portion showing the amplifier biased off and then on with a portion showing the relay energized.

The aforegoing detailed description is for channel X gain being low; a description for channel X gain being high is exactly the same except the output from difference amplifier 27 is a positive pulse and gain balance motor 18 rotates in the direction causing channel X receiver gain to decrease.

Assume that the gain for channel Y receiver 15 changes and that a gain balance error is detected at the output of channel Y difference amplifier 28. From FIGURE 1, it is seen that the channel Y error detection and correction circuits will change the gain of channel Y receiver 15 to bring it back in balance with reference channel receiver 16; however, at the same time channel X difference amplifier 27 will have an output. Channel X error circuits will think that the channel X receiver gain is in error and will attempt to change the gain thereof to be the same as the gain of the channel Y receiver. The fact that the channel X receiver gain will be compared with an incorrect reference will cause no problem since the channel X receiver gain balance motor 18 will not be permitted to operate until the gain of channel Y receiver is balanced with that of the reference channel; this is because one pair of channel Y cathode relay contacts 98 and 100 will have opened breaking the +28 volts DC supply to channel X.

It is to be noted that the transmission gate enable pulses are applied to transmission gates 22, 23, 24 and 25 only when gain balancing of receivers 14, 15 and 17 is desired. Otherwise for normal radar operation outputs are provided by way of terminals 110, 111, 112 and 113.

Figure 2:
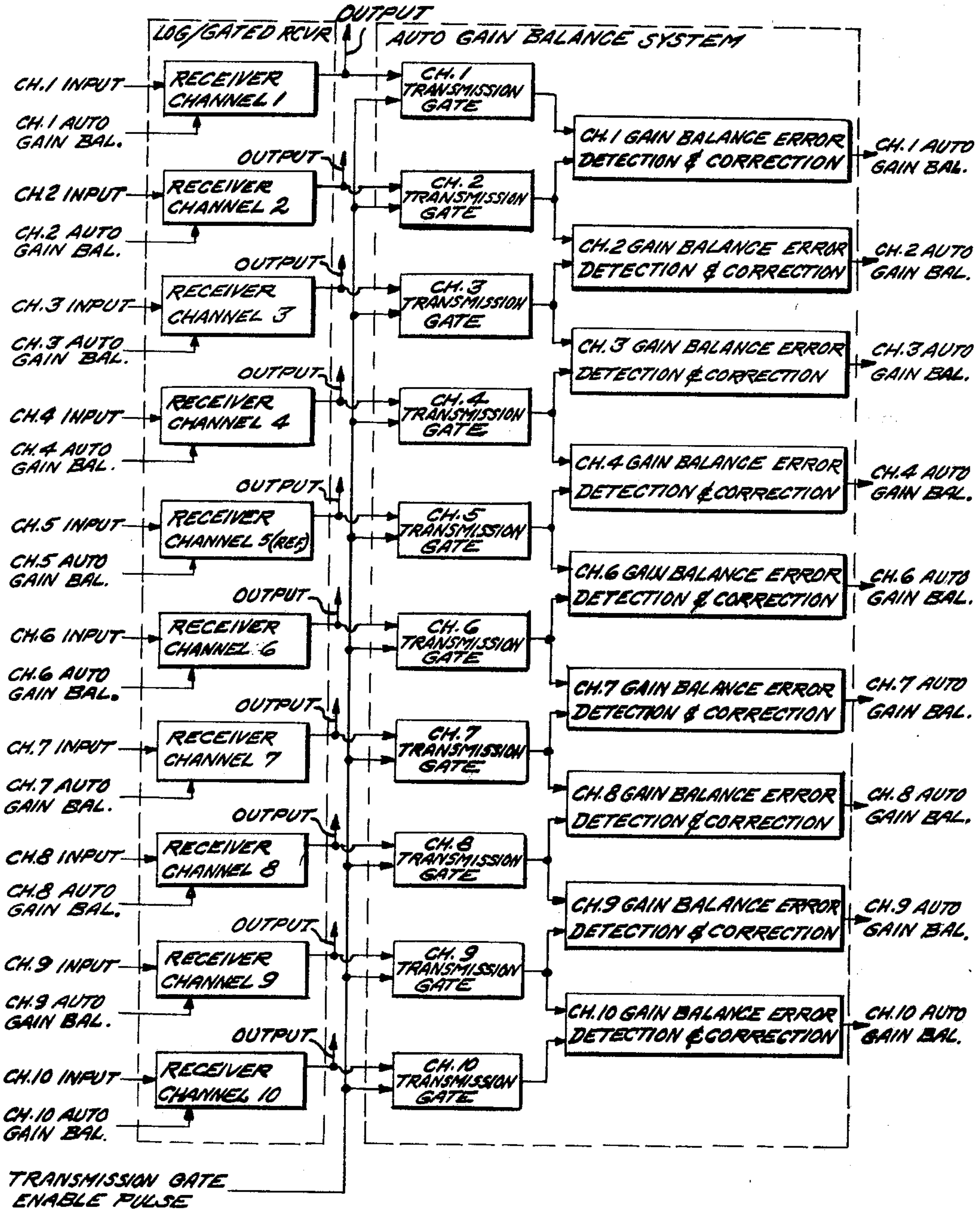
FIGURE 2 is a block diagram showing a ten channel system.

Now referring to FIGURE 2, there is shown a simplified block diagram of a ten channel system that is identical to that of the system shown in FIGURE 1 except that FIGURE 1 illustrates a four channel system. Channel 5 is designated, in this instance, as the reference channel and channel 4 might be equated with the Y channel of FIGURE 1. Channel 5 and the Y channel show the identical receivers and transmission gates, however, channel 4 gain balance error detection and correction blocks is equivalent of the following components of Y channel of FIGURE 1: difference amplifier 28; high gain gate 37; low gain gate 38; capacitors 45 and 46; video amplifiers 51 and 52; capacitors 57 and 58; one shot multivibrators 63 and 64; integrators 75 and 76; and amplifiers 81 and 82.

The +28 volts DC circuits are arranged so that on each side of the reference channel automatic gain adjustments of the channel nearer the reference channel always takes precedence over all other channels (i.e. if channel 5 is the reference channel, and channel 7 error circuits detect an error, the +28 volts DC circuits to channels 8, 9, and 10 will be broken until channel 7 gain is automatically balanced with that of channel 6).

An alternate method for obtaining gain balance would be to compare each channel output with the same reference signal instead of comparing adjacent channel outputs. The gain balance test signal for each channel along with a coincident reference signal would be fed to the difference amplifiers; in other words, the reference signal would replace the adjacent channel input to each difference amplifier. In this arrangement, the output of each receiver channel would always be automatically adjusted to be equal to the reference signal.

The reference signal has an advantage over the adjacent method in that a gain error in any channel would automatically be corrected independently of all other channels, since the relays are in series with the +28 volts DC circuit would not be present. Another advantage is that outputs of all channels could be changed simultaneously while maintaining gain balance simply by changing the amplitude of the reference signal.

What I claim is:

1. An automatic gain balancing system for multiple radiant energy adjacent receivers initially having the gains thereof preset to identical magnitudes comprising a multiplicity of said adjacent radiant energy receivers, one of said receivers being selected as a gain reference, movable means integrated with each receiver to vary the gain thereof, a motor interconnected with each of said movable gain means, the motor of said reference receiver being only manually operable and the others of said motors being operable upon application of electrical power thereto, means to compare the output signals from each pair of adjacent receivers to provide an error and correction signal being representative of any variation of gain in either of said adjacent receivers from said preset magnitude, and means to apply said electrical power to said motor of said gain varying receiver in accordance with said error and correction signal until the gain of said receiver returns to said preset magnitude.

2. An automatic gain balancing system for multiple radiant energy adjacent receivers initially having the gains thereof preset to identical magnitudes comprising a multiplicity of said adjacent radiant energy receivers, one of said receivers being selected as a gain reference and being interposed between said other radiant energy receivers, movable means integrated with each receiver to vary the gain thereof, a motor interconnected with each of said movable gain means, the motor of said interposed reference receiver being only manually operable and the others of said motors being operable upon application of electrical power thereto, means to compare the output signals from each pair of adjacent receivers to provide an error and correction signal being representative of any variation of gain in either of said pair of adjacent receivers from their said preset magnitudes, and means to apply said electrical power to said motor of said gain varying receiver in accordance with said error and correction signal until the gain of said varying receiver returns to said preset magnitude.

3. An automatic gain balancing system for multiple radiant energy adjacent parallel receivers initially having the gains thereof preset to identical magnitude comprising a multiplicity of said adjacent receivers, one of said receivers being selected as a gain reference and being interposed between said other receivers, movable means integrated with each of said receivers to vary the gain thereof, a motor interconnected with each of said movable gain means, the motor of said interposed reference receiver being only manually operable and the others of said motors being operable upon application of electrical power thereto, means to compare the output signals from each pair of adjacent receivers to provide an error and correction signal being representative of any variation of gain in either of said pair of receivers from their said preset magnitudes, and means for gain adjustment by applying said electrical power to said motor of said gain varying receiver in accordance with said error and correction signal until the gain of said varying receiver returns to said preset magnitude, said gain adjustment means first operating upon the receiver nearest said reference receiver and then upon any subsequent receiver in sequence.

4. An automatic gain balancing system as described in claim 3 further including means to initiate said comparison at preselected times.

5. An automatic gain balancing system for multiple radiant energy adjacent receivers initially having the gains thereof preset to identical magnitudes comprising a multiplicity of said adjacent radiant energy receivers, one of said receivers being selected as a gain reference and being interposed between said other radiant energy receivers, movable means integrated with each of said receivers to vary the gain thereof, a motor interconnected with each of said movable gain means, the motor of said interposed reference receiver being only manually operable and said others being operable upon application of electrical power thereto, means to apply to the input of each of said receivers a series of equal amplitude pulses, a transmission gate for the output of each of said receivers, said transmission gates only passing pulses from said receivers upon the receipt of enabling pulses, a difference amplifier for the output pulses of each pair of adjacent transmission gates, each of said difference amplifiers providing positive and negative output pulses, means to provide separate channels for each of said positive and negative pulses, a one shot multivibrator having a pulse output of predetermined width for each of said channels, said multivibrator being triggered by the pulses appearing in each of said channels, an integrator having a predetermined time constant connected at the output of each of said multivibrators, a threshold switch circuit in combination with an amplifier being normally biased off for each of said integrators, said amplifier having a switching relay in the cathode circuit thereof, and a power source interconnected with each of said switching relays, said power source providing said electrical power to any one of said motors whenever the gain of its associated receiver varies from that of the reference until the gain thereof returns to said preset magnitude.

No references cited.

KATHLEEN H. CLAFFY, *Primary Examiner.*

R. S. BELL, *Assistant Examiner.*